United States Patent
Di et al.

(10) Patent No.: US 12,004,011 B2
(45) Date of Patent: Jun. 4, 2024

(54) APPARATUSES AND METHODS FOR ADJUSTING BITRATE FOR VOICE FRAMES

(71) Applicant: MediaTek Singapore Pte. Ltd., Singapore (SG)

(72) Inventors: Zhipeng Di, Beijing (CN); Wei Tang, Beijing (CN); Yan Wu, Beijing (CN); Quanping Wang, Beijing (CN); Lixia Wang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 44 days.

(21) Appl. No.: 17/829,696

(22) Filed: Jun. 1, 2022

(65) Prior Publication Data

US 2023/0362733 A1    Nov. 9, 2023

(30) Foreign Application Priority Data

May 5, 2022    (CN) .......................... 202210481962.8

(51) Int. Cl.
*H04W 28/10* (2009.01)
*H04L 65/1059* (2022.01)
*H04L 65/1069* (2022.01)

(52) U.S. Cl.
CPC ......... *H04W 28/10* (2013.01); *H04L 65/1059* (2013.01); *H04L 65/1069* (2013.01)

(58) Field of Classification Search
CPC ............... H04W 28/10; H04L 65/1069; H04L 65/1046; H04L 65/607; H04L 65/608; H04L 65/1059
See application file for complete search history.

(56) References Cited

U.S. PATENT DOCUMENTS

| | | | |
|---|---|---|---|
| 9,253,238 B2 | 2/2016 | Khay-Ibbat et al. | |
| 10,638,351 B2 | 4/2020 | Li et al. | |
| 2020/0106815 A1* | 4/2020 | Wang | H04L 65/764 |
| 2021/0258363 A1* | 8/2021 | Ragot | H04L 69/24 |
| 2022/0394509 A1* | 12/2022 | Chmiel | H04L 1/203 |

FOREIGN PATENT DOCUMENTS

| | | |
|---|---|---|
| CN | 106301679 A | 1/2017 |
| CN | 106850615 A | 6/2017 |
| CN | 113271316 A | 8/2021 |
| TW | I566570 B | 1/2017 |

OTHER PUBLICATIONS

TW Office Action dated Dec. 29, 2022 in Taiwan application No. 111121131.

* cited by examiner

*Primary Examiner* — Khaled M Kassim
*Assistant Examiner* — Najeeb Ansari
(74) *Attorney, Agent, or Firm* — McClure, Qualey & Rodack, LLP

(57) ABSTRACT

A User Equipment (UE) is provided. The UE includes a wireless transceiver and a controller. The wireless transceiver is configured to perform wireless transmission and reception to and from a mobile communication network. The controller is configured to accumulate Transport Block Size (TBS) assigned by the mobile communication network to obtain an estimated TBS during each first period, and obtain an estimated bitrate of a plurality of voice frames to be transmitted to the mobile communication network according to the estimated TBS. When the estimated bitrate of voice frames is different from current bitrate of the voice frames during a second period, the controller is configured to adjust the current bitrate according to the estimated bitrate.

16 Claims, 8 Drawing Sheets

| CODEC Type | BitRate | Payload | TBS (ROHC OFF IPv6) | TBS (ROHC OFF IPv4) | TBS (ROHC ON) |
|---|---|---|---|---|---|
| Type_A1 | BR1 | PL1 | TBS_11 | TBS_21 | TBS_31 |
| Type_A2 | BR2 | PL2 | TBS_12 | TBS_22 | TBS_32 |
| Type_A3 | BR3 | PL3 | TBS_13 | TBS_23 | TBS_33 |
| Type_B1 | BR4 | PL4 | TBS_14 | TBS_24 | TBS_34 |
| Type_B2 | BR5 | PL5 | TBS_15 | TBS_25 | TBS_35 |
| Type_B3 | BR6 | PL6 | TBS_16 | TBS_26 | TBS_36 |
| Type_C1 | BR7 | PL7 | TBS_17 | TBS_27 | TBS_37 |
| Type_C2 | BR8 | PL8 | TBS_18 | TBS_28 | TBS_38 |

FIG. 6

APPARATUSES AND METHODS FOR ADJUSTING BITRATE FOR VOICE FRAMES

CROSS REFERENCE TO RELATED APPLICATIONS

This application claims priority of China Patent Application No. 202210481962.8, filed on May 5, 2022, the entirety of which is incorporated by reference herein.

BACKGROUND OF THE INVENTION

Field of the Invention

The invention relates to wireless communications, and more particularly to a User Equipment (UE) in a wireless communication.

Description of the Related Art

In a typical wireless communication environment, a UE (also called a Mobile Station (MS)), such as a mobile telephone (also known as a cellular or cell phone), or a tablet Personal Computer (PC) with wireless communication capability may communicate voice and data signals over one or more wireless communication networks. The wireless communication between the UE and the wireless communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc.

Wireless communications networks have grown exponentially over the years. A Long-Term Evolution (LTE) system offers high peak data rates, low latency, improved system capacity, and low operating costs resulting from simplified network architecture. LTE systems, also known as 4G, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as UEs.

In LTE, Voice over LTE (VoLTE) can be used to establish a voice or video call via the packet switched domain. The voice or video call can be performed over the IP Multimedia Subsystem (IMS) network.

BRIEF SUMMARY OF THE INVENTION

Apparatuses and methods for adjusting bitrate for voice frames are provided. An embodiment of a UE is provided. The UE includes a wireless transceiver and a controller. The wireless transceiver is configured to perform wireless transmission and reception to and from a mobile communication network. The controller is configured to accumulate Transport Block Size (TBS) assigned by the mobile communication network to obtain an estimated TBS during each first period, and obtain an estimated bitrate of a plurality of voice frames to be transmitted to the mobile communication network according to the estimated TBS. When the estimated bitrate of voice frames is different from a current bitrate of the voice frames during a second period, the controller is configured to adjust the current bitrate according to the estimated bitrate. The second period is longer than the first period.

Furthermore, an embodiment of a method executed by UE is provided. A plurality of voice frames are provided with a current bitrate by a coder/decoder (codec). The voice frames are to be transmitted to a mobile communication network. Transport Block Size (TBS) assigned by the mobile communication network is accumulated to obtain an estimated TBS during each first period. An estimated bitrate of the voice frames is obtained according to the estimated TBS. The current bitrate is adjusted according to the estimated bitrate when a high bitrate period counter or a low bitrate period counter indicates that the estimated bitrate is different from the current bitrate during a second period. The second period is an integer multiple of the first period. The integer multiple is determined by a threshold value.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 6 shows a rate mapping table according to some embodiments of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Some variations of the embodiments are described. Throughout the various views and illustrative embodiments, like reference numbers are used to designate like elements.

It should be understood that additional operations can be provided before, during, and/or after a disclosed method, and some of the operations described can be replaced or eliminated for other embodiments of the method.

Figure 1:
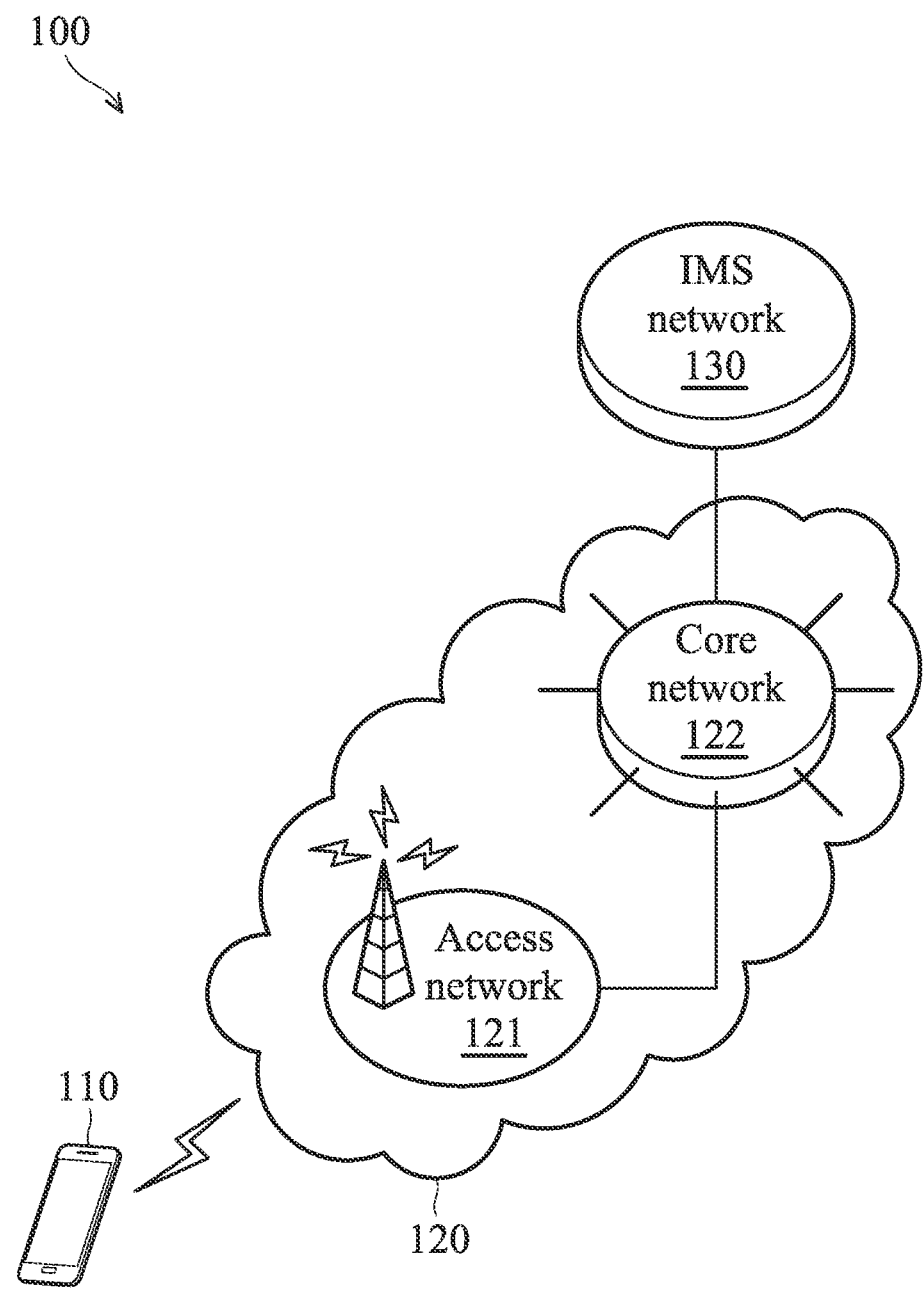
FIG. 1 shows a block diagram of a wireless communication environment according to some embodiment of the invention.

FIG. 1 shows a block diagram of a wireless communication environment 100 according to some embodiment of the invention. The wireless communication environment 100 includes a User Equipment (UE) 110, a mobile communication network 120, and an IP Multimedia Subsystem (IMS) network 130 (e.g., deployed by the operator of the mobile communication network 120). In some embodiments, the IMS network 130 may be incorporated into the mobile communication network 120.

The UE 110 may be a feature phone, a smart phone, a panel Personal Computer (PC), a laptop computer, a Machine Type Communication (MTC) device, or any mobile communication device supporting the RATs utilized by the mobile communication network 120. The UE 110 may connect to the mobile communication network 120 to obtain voice and/or data services.

The mobile communication network 120 may include an access network 121 and a core network 122. The access network 121 is responsible for processing radio signals, terminating radio protocols, and connecting the UE 110 with the core network 122, while the core network 122 is responsible for performing mobility management, network-side authentication, and interfaces with public/external networks (e.g., the IMS network 130 and/or the Internet).

In some embodiments, the mobile communication network 120 is a 4G network (e.g., an LTE/LTE-A/TD-LTE network). Furthermore, the access network 121 may be an Evolved-Universal Terrestrial Radio Access Network (E-UTRAN) and the core network 122 may be an Evolved Packet Core (EPC). The E-UTRAN may include at least an evolved NodeB (eNB) (e.g., a macro eNB, femto eNB, or pico eNB). The EPC may include a Home Subscriber Server (HSS), Mobility Management Entity (MME), Serving Gateway (S-GW), and Packet Data Network Gateway (PDN-GW or P-GW).

The IMS network 130 is a system consisting of various network functions for providing IP multimedia services to the UE 110 over the mobile communication network 120. For example, the IMS network 130 may include an IMS core which at least includes a Home Subscriber Server (HSS), a Call Session Control Function (CSCF), a Signaling Gateway (SGW), a Media Gateway Control Function (MGCF), and a Media Resource Function (MRF). The HSS generally refers to the master database that maintains all user profile information used to authenticate and authorize subscribers. The CSCF is the heart of the IMS architecture, which is responsible for controlling sessions between endpoints (referred to as terminals in the IMS specifications) and applications. The SGW and the MGCF are responsible for providing interoperability with the Public Switched Telephone Network (PSTN). The MRF provides media-related functions such as the playing of tones and digital announcements.

The IP multimedia services provided by the IMS network 130 may include IMS voice services and/or IMS data services. Specifically, the IMS voice services (also called IMS Voice over Packet-Switched (IMSVoPS) services) may refer to IMS services that involve voice component, such as Voice over LTE (VoLTE), Video over LTE (ViLTE), Voice over NR (VoNR), and Video over NR (ViNR), etc., while the IMS data services (also called IMS Data over PS (IMSDoPS) services) may refer to IMS services that do not involve voice component, such as Short Message Service (SMS) over IMS, Mission Critical Push To Talk (MCPTT), Mission Critical Video (MCVideo), Mission Critical Data (MCData), Rich Communication Services (RCS), XML Configuration Access Protocol (XCAP), and others.

In wireless communication environment 100, the UE 110 can support the IMS voice services and the IMS data services of the IMS network 130. Furthermore, the mobile communication network 120 can support the IMS voice services and the IMS data services of the IMS network 130, depending on the service deployment scenarios of the operator.

Figure 2:
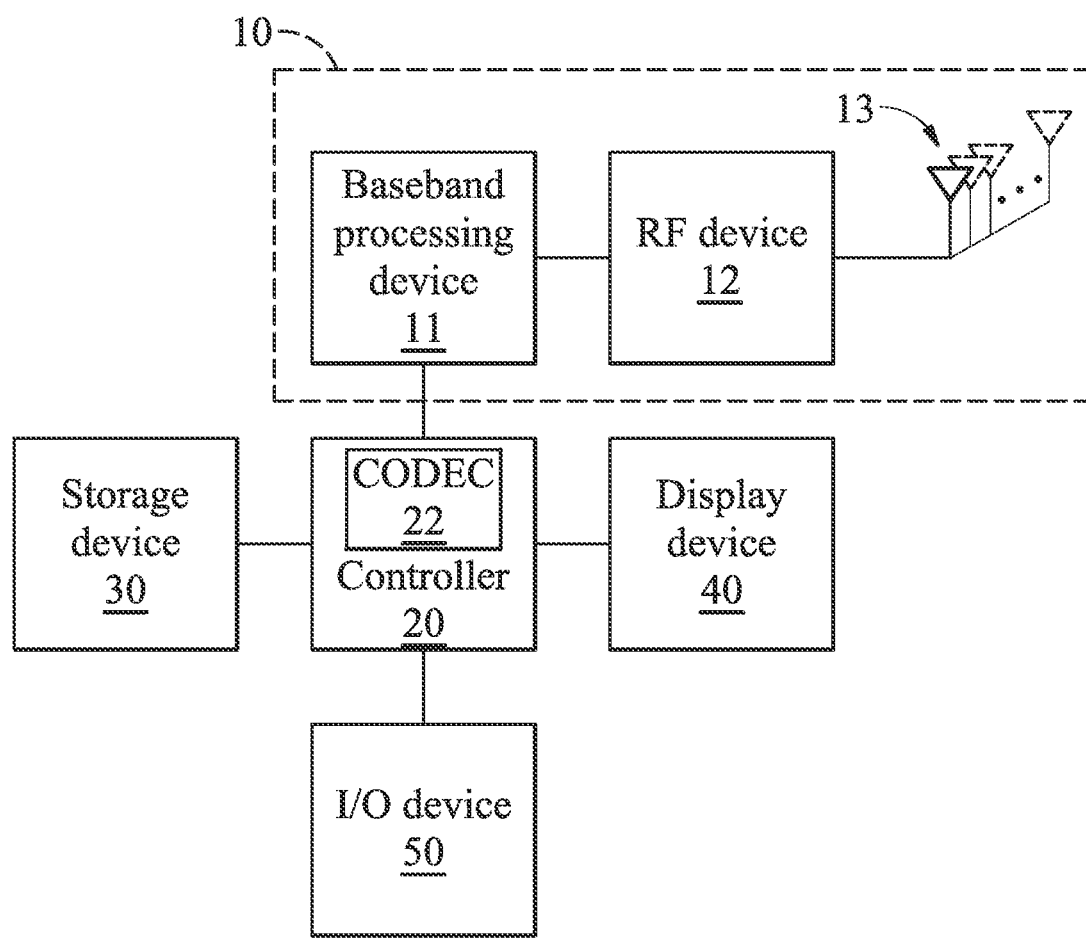
FIG. 2 shows a block diagram illustrating the UE of FIG. 1 according to some embodiment of the invention.

FIG. 2 shows a block diagram illustrating the UE 110 of FIG. 1 according to some embodiment of the invention. The UE 110 may include a wireless transceiver 10, a controller 20, a storage device 30, a display device 40, and an Input/Output (I/O) device 50.

The wireless transceiver 10 is configured to perform wireless transmission and reception to and from the mobile communication network 120. Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 900 MHz, 2100 MHz, or 2.6 GHz utilized in 4G (e.g., LTE/LTE-A/TD-LTE) systems, or may be any radio frequency (e.g., 30 GHz~300 GHz for mmWave, or 3.3 GHz~4.9 GHz for sub-6) utilized in 5G (e.g., NR) systems, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing. For example, the controller 20 includes a coder/decoder (CODEC) 22 for audio and video compression.

In the UE 110, the controller 20 is configured to control the wireless transceiver 10 for wireless transceiving with the mobile communication network 120, enable the storage device 30 for storing and retrieving data, send a series of frame data (e.g. representing text messages, graphics, images, etc.) to the display device 40, and receive/output signals from/to the I/O device 50.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory computer-readable storage medium, including a Universal Integrated Circuit Card (UICC) (e.g., a Subscriber Identity Module (SIM) or Universal SIM (USIM) card), a memory (e.g., a FLASH memory or a Non-Volatile Random Access Memory (NVRAM)), a magnetic storage device (e.g., a hard disk or a magnetic tape), or an optical disc, or any combination thereof for storing data, instructions, and/or program code of applications, communication protocols, and/or the method of the present application.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users, such as receiving user inputs, and outputting prompts to users.

In the UE 110, the controller 20 coordinates the aforementioned operations of the wireless transceiver 10, the storage device 30, the display device 40, and the I/O device 50 for performing the method for providing reliable delivery of application data. For example, during a voice call (e.g., a long-term evolution voice bearer (Voice-over-LTE, VoLTE) call) process, when obtaining the audio data (e.g., the user's voice from the I/O device 50 (e.g., the microphone)), the controller 20 is configured to control the CODEC 22 to encode the audio data with adjustable bitrate to generate the voice frames to the wireless transceiver 10, so as to transmit the Real-time Transport Protocol (RTP) packets with the voice frames to the mobile communication network 120 of FIG. 1. In order to simplify the description, the analog-to-digital converter (ADC), the digital-to-analog converter (DAC) and the related circuits for processing the audio data are omitted in the UE 110.

VoLTE is a service for carrying voice and data on LTE. In general, VoLTE has two state modes, i.e., talking state and listening state. In a VoLTE call duration, a voice transmission period of the VoLTE call duration is arranged for talking (i.e., the talking state), a voice receiving period of the VoLTE call duration is arranged for listening (i.e., the listening state), and an idle period of the VoLTE call duration may be silent. Furthermore, during the talking state, a voice packet is generated every 20 milliseconds (ms), and the size of the voice packet (e.g., the number of voice frames) may depend on the bit rate for the audio codec. During the listening state, the UE 110 may generate a Silent Indicator (SI) packet every 160 ms.

It should be understood that the components described in the embodiment of FIG. 2 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications. Alternatively, the UE 110 may include fewer components. For example, the UE 110 may not include the display device 40.

Figure 3:
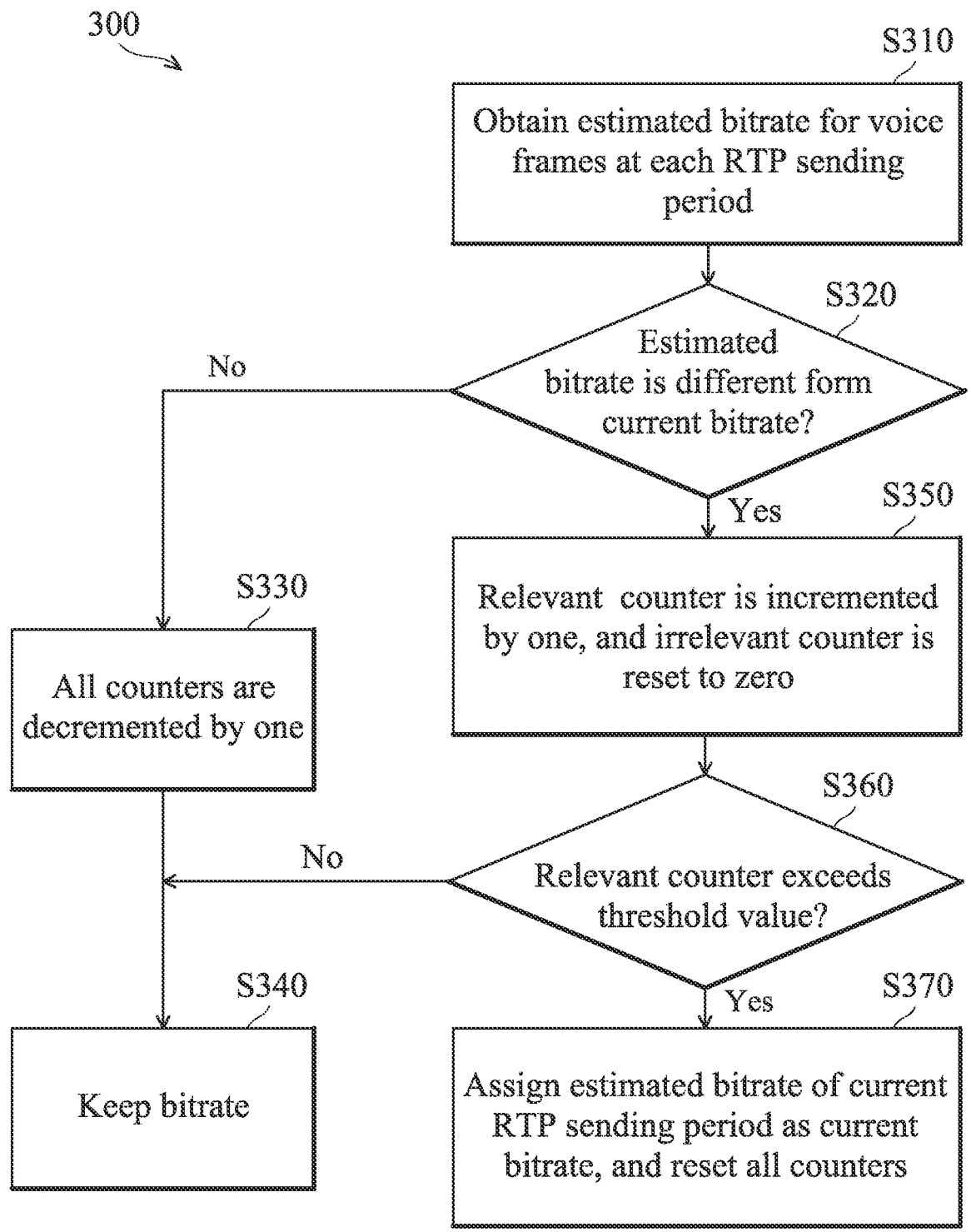
FIG. 3 shows a flow chart illustrating a method for adjusting bitrate for voice frames in a real-time service (e.g., a VoLTE call) according to some embodiments of the invention.

FIG. 3 shows a flow chart illustrating a method 300 for adjusting bitrate for voice frames in a real-time service (e.g., a VoLTE call) according to some embodiments of the invention. In some embodiments, the method 300 is applied to and executed by a controller (e.g., the controller 20) of a UE (e.g., the UE 110) communicatively connected to a mobile communication network (e.g., the mobile communication network 120) supporting the IMS services. Furthermore, in the real-time service, the voice frames are transmitted to the mobile communication network from the UE.

First, in step S310, the estimated bitrate BRe of the voice frames is obtained at each Real-time Transport Protocol (RTP) sending period (e.g., every 20 ms for the talking state in the VoLTE call). The method of obtaining the estimated bitrate BRe will be described later. In some embodiments, the controller of the UE is configured to obtain the estimated bitrate BRe according to an estimated Transport Block Size (TBS) in the corresponding RTP sending period.

In step S320, the controller is configured to determine whether the estimated bitrate BRe of the voice frames is different from the current bitrate BRc of the voice frames in the corresponding RTP sending period. In the UE, the current bitrate BRc of the voice frames represents the bitrate of CODEC for audio data.

If the estimated bitrate BRe is equal to the current bitrate BRc for the voice frames, a high bitrate period counter C_HB is decremented by one (i.e., C_HB=C_HB-1) and a low bitrate period counter C_LB is decremented by one (i.e., C_LB=C_LB-1) in step S330.

In the UE, the high bitrate period counter C_HB is used to count the number of RTP sending periods that have higher estimated bitrate BRe (e.g., the estimated bitrate BRe is greater than the current bitrate BRc). Similarly, the low bitrate period counter C_LB is used to count the number of RTP sending periods that have lower estimated bitrate BRe (e.g., the estimated bitrate BRe is less than the current bitrate BRc).

In step S340, the UE is configured to keep the current bitrate BRc in the current RTP sending period. In other words, the UE does not adjust the current bitrate BRc according to the estimated bitrate BRe of the corresponding RTP sending period.

In some embodiments, the values of the high bitrate period counter C_HB and the low bitrate period counter C_LB are not less than zero. If the high bitrate period counter C_HB or the low bitrate period counter C_LB is less than zero after decrementing by one, the high bitrate period counter C_HB or the low bitrate period counter C_LB will remain at zero.

If the estimated bitrate BRe is different from the current bitrate BRc for the voice frames, the high bitrate period counter C_HB and the low bitrate period counter C_LB are changed, so that the relevant count is incremented by one and the irrelevant counter is reset to zero among the high bitrate period counter C_HB and low bitrate period counter C_LB (step S350). For example, one of the high bitrate period counter C_HB and the low bitrate period counter C_LB is incremented by one and the other counter is reset to zero.

When the estimated bitrate BRe is greater than the current bitrate BRc for the voice frames (i.e., BRe>BRc), the high bitrate period counter C_HB is incremented by one (i.e., C_HB=C_HB+1) and the low bitrate period counter C_LB is reset to zero (i.e., C_LB=0). In other words, the high bitrate period counter C_HB is the relevant count and the low bitrate period counter C_LB is the irrelevant count when the estimated bitrate BRe is greater than the current bitrate BRc.

When the estimated bitrate BRe is less than the current bitrate BRc for the voice frames (i.e., BRe<BRc), the low bitrate period counter C_LB is incremented by one (i.e., C_LB=C_LB+1) and the high bitrate period counter C_HB is reset to zero (i.e., C_HB=0). In other words, the low bitrate period counter C_LB is the relevant count and the high bitrate period counter C_HB is the irrelevant count when the estimated bitrate BRe is less than the current bitrate BRc.

The value of the relevant count indicates that the number of consecutive RTP sending periods for which the estimated bitrate BRe is greater than the current bitrate BRc or the number of consecutive RTP sending periods for which the estimated bitrate BRe is less than the current bitrate BRc. For example, if the estimated bitrate BRe is greater than the current bitrate BRc for three consecutive RTP sending periods, the high bitrate period counter C_HB is three and the low bitrate period counter C_LB is zero. If the estimated bitrate BRe is less than the current bitrate BRc for five consecutive RTP sending periods, the low bitrate period counter C_LB is five and the high bitrate period counter C_HB is zero.

After the relevant count is incremented by one (step S350), it is determined whether the relevant count exceeds a threshold value TH (step S360). The threshold value TH is set by the controller of the UE according to various real-time applications.

If the relevant count does not exceed the threshold value TH, the UE is configured to keep the current bitrate BRc (step S340) in the current RTP sending period. In other words, the UE does not adjust the current bitrate BRc according to the estimated bitrate BRe of the corresponding RTP sending period. Conversely, if the relevant count exceeds the threshold value TH, the UE is configured to adjust the current bitrate BRc by assigning the estimated bitrate BRe as the current bitrate BRc (step S370). Simultaneously, the low bitrate period counter C_LB and the high bitrate period counter C_HB are reset to zero for subsequent RTP sending periods. Thus, the CODEC (e.g., the CODEC 22) of the UE is configured to provide the voice frames according to the adjusted current bitrate BRc (i.e., the estimated bitrate BRe).

In some embodiments, the threshold value TH is set to five for auditory temporal masking effect. If the RTP sending period is 20 ms, and the adjustment of bitrate in step S370 is triggered every five RTP sending periods (i.e., 100 ms). In such embodiment, if the high bitrate period counter C_HB incremented by one is six in step S350, it is determined that the high bitrate period counter C_HB exceeds the threshold value TH (step S360). Thus, the controller of the UE determines that the estimated bitrate BRe has been greater than the current bitrate BRc for five consecutive RTP sending periods, and then the controller of the UE is configured to change the current bitrate BRc according to the estimated bitrate BRe, i.e., the current bitrate BRc is increased by the UE.

Conversely, if the low bitrate period counter C_LB incremented by one is six in step S350, it is determined that the high bitrate period counter C_LB exceeds the threshold value TH in step S360. Thus, the controller of the UE determines that the estimated bitrate BRe has been less than the current bitrate BRc for five consecutive RTP sending periods, and then the controller of the UE is configured to change the current bitrate BRc according to the estimated bitrate BRe, i.e., the current bitrate BRc is decreased by the UE.

Figure 4:
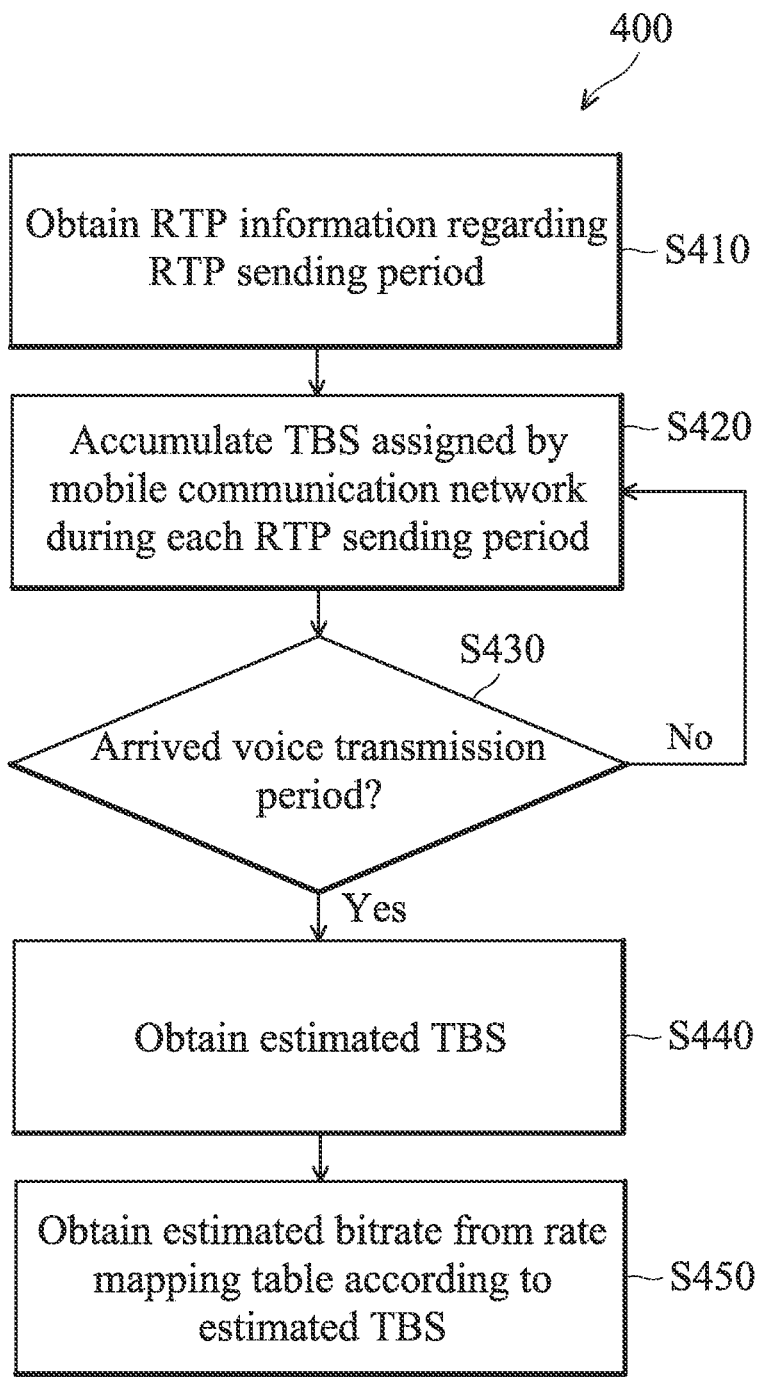
FIG. 4 shows a flow chart illustrating a method for obtaining the estimated bitrate BRe (e.g., step S310 of FIG. 3) according to some embodiments of the invention.

FIG. 4 shows a flow chart illustrating a method 400 for obtaining the estimated bitrate BRe (e.g., step S310 of FIG. 3) according to some embodiments of the invention. In some embodiments, the method 400 is applied to and executed by a controller (e.g., the controller 20) of a UE (e.g., the UE 110) communicatively connected to a mobile communication network (e.g., the mobile communication network 120) supporting the IMS services. Furthermore, in the real-time service, the voice frames are transmitted to the mobile communication network from the UE.

First, in step S410, RTP information regarding RTP sending period is obtained. In some embodiments, the RTP sending period is 20 ms for the talking state in the VoLTE call.

In step S420, the TBS assigned by the mobile communication network is accumulated by the controller of the UE during each RTP sending period.

In step S430, the controller of the UE is configured to determine whether arrive a voice transmission period of the VoLTE call duration (e.g., the talking state). If the voice transmission period has not been arrived (i.e., a voice receiving period or an idle period of the VoLTE call duration is arrived), the flow of the method 400 returns to step S420. If the voice transmission period has been arrived, an estimated TBS is obtained in step S440.

In some embodiments, the controller is configured to perform an Exponential Moving Average (EMA) on the accumulated TBS over the current RTP sending period and previous RTP sending periods to obtain the estimated TBS. The EMA has the following properties: iterative algorithm to reduce fluctuations in data flow, a practical approach to predicting trends, and relatively low computational cost. After applying EMA, value of TBS become less fluctuated, and is suitable for the criteria of bitrate adaption.

Figure 5:
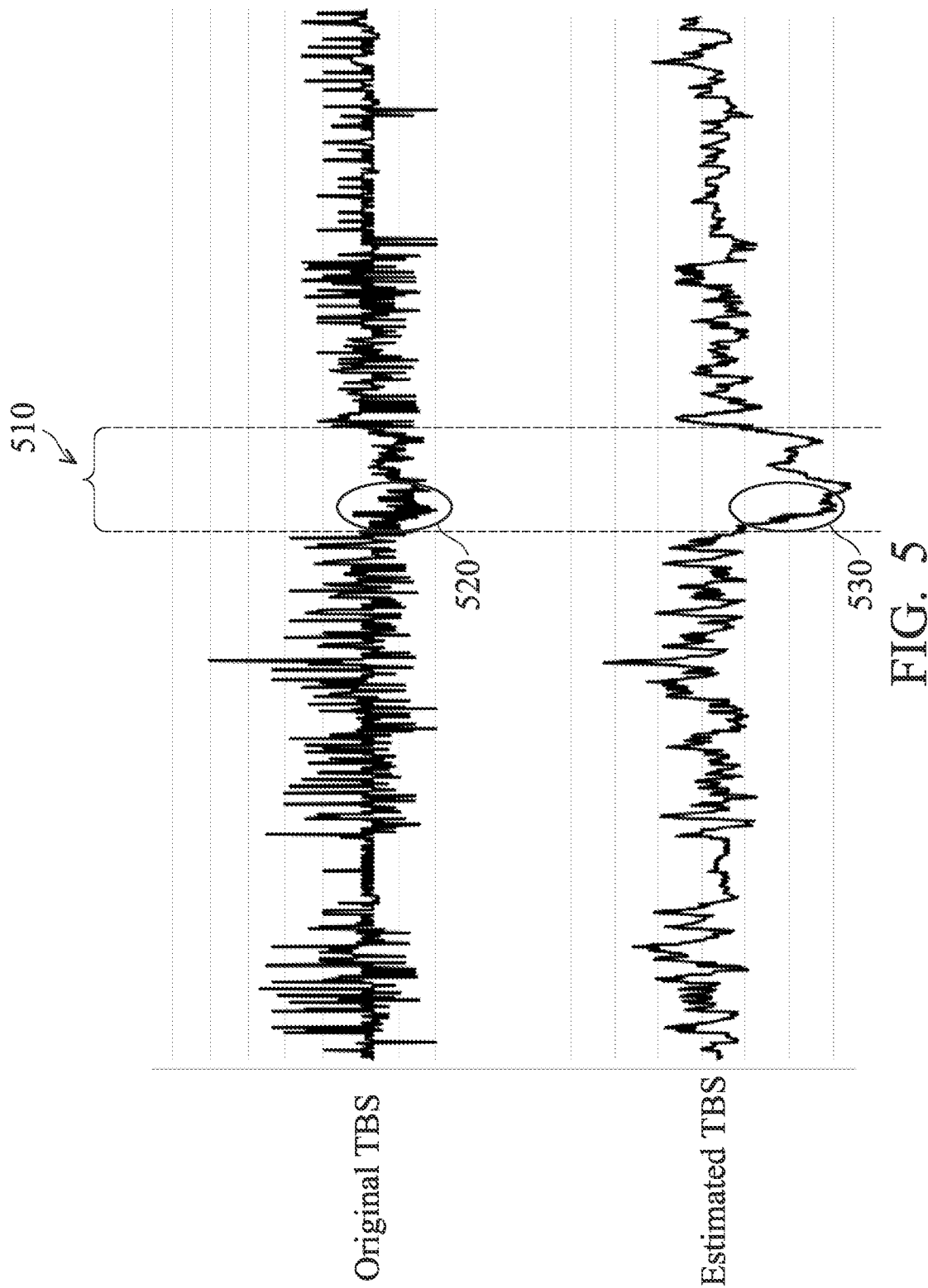
FIG. 5 shows a schematic illustrating the relationship between the original TBS and the estimated TBS according to some embodiments of the invention.

Referring to FIG. 5, FIG. 5 shows a schematic illustrating the relationship between the original TBS and the estimated TBS according to some embodiments of the invention. Take the time period 510 as an example to illustrate, the original TBS fluctuates greatly, as shown in label 520, and the original TBS with large fluctuation may vary between 56 bits and 712 bits, i.e., the original TBS will vary by several times. Conversely, the estimated TBS with low fluctuation may vary between 335 bits and 432 bits, as shown in label 530.

The EMA is a first-order infinite impulse response filter that applies weighting factors which decrease exponentially. The weighting for each older datum decreases exponentially, never reaching zero. The EMA for a series of Y (i.e., the TBS) may be calculated recursively:

$$S_t = \begin{cases} Y_1, t = 1 \\ \alpha Y_t + (1-\alpha) \cdot S_{t-1}, x \geq 0 \end{cases},$$

where the coefficient α represents the degree of weighting decrease, that is a constant smoothing factor between 0 and 1. Furthermore, $Y_t$ is the value at a time period, and St is the value of the EMA at any time period. In some embodiments, the coefficient α can be obtained as following equation:

$$\alpha = \frac{2}{N+1},$$

where N represents the window width. In some embodiments, N is a discrete window size, e.g., N=15. Furthermore, the coefficient α controls decay rate, based on series expansion:

$$EMA=\alpha \times (Y_t+(1-\alpha)Y_{t-1}+(1-\alpha)^2 Y_{t-2}+(1-\alpha)^3 Y_{t-3}+ \ldots)$$

Moreover, terms earlier than N are negligible (e.g., <0.01%).

It should be noted that using the EMA to obtain the estimated TBS is an example, and not to limit the invention. Other algorithms that reduce TBS fluctuation can also be used.

Referring back to step S450 of FIG. 4, according to the estimated TBS, the estimated bitrate BRe is selected from a rate mapping table. In some embodiments, the estimated bitrate BRe is the biggest allowable bitrate corresponding to the estimated TBS in the rate mapping table. Moreover, the rate mapping table is differentiate by Robust Header Compression (ROHC) on/off and IP address type, such as Internet Protocol Version 4 (IPv4) or Internet Protocol Version 6 (IPv6).

According to the method 400 of FIG. 4, by performing the EMA, the UE is configured to increase the estimated bitrate BRe when the estimated TBS is gradually increased. Furthermore, the UE is configured to decrease the estimated bitrate BRe when the estimated TBS is gradually decreased.

FIG. 6 shows a rate mapping table 600 according to some embodiments of the invention. The rate mapping table 600 may include various audio codec types that the controller of the UE can support, such as Enhanced Voice Services (EVS) codec, Adaptive multi-Rate (AMR) compression, Adaptive Multi-Rate Wideband (AMR-WB) and so on.

In FIG. 6, the rate mapping table 500 includes three audio codec types: Type_A, Type_B and Type_C. In each of the audio codec types, different bitrates are provided. For example, the audio codec type Type_A includes a first type Type_A1 with the bitrate BR1, a second type Type_A2 with the bitrate BR2, and a third type Type_A3 with the bitrate BR3. Furthermore, according to ROHC on/off and IP address type (e.g., IPv6 and IPv4), the first type Type_A1, the second type Type_A2 and the third type Type_A3 have respective TBS.

In some embodiments, by comparing the estimated TBS obtained in step S440 of FIG. 4 and the TBS of ROHC on/off and IP address type in the rate mapping table 600, (e.g., TBS_11 through TBS_18 for ROHC off and IPv6, TBS_21 through TBS_28 for ROHC off and IPv4, and TBS_31 through TBS_38 for ROHC on), the audio codec type having the biggest allowable bitrate is selected as the estimated bitrate BRe, as described in method 400 and step S310 of method 300.

Figure 7A:
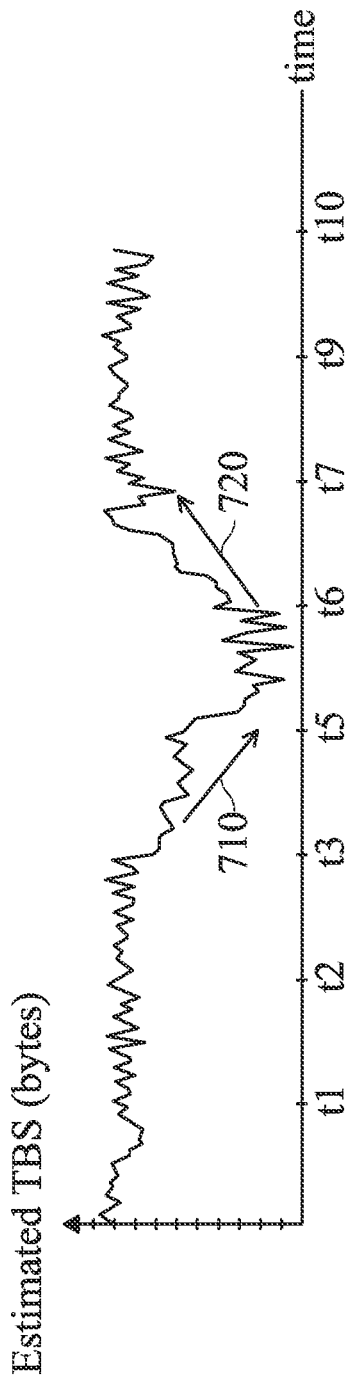
FIG. 7A shows a schematic illustrating the estimated TBS according to some embodiments of the invention.
Figure 7B:
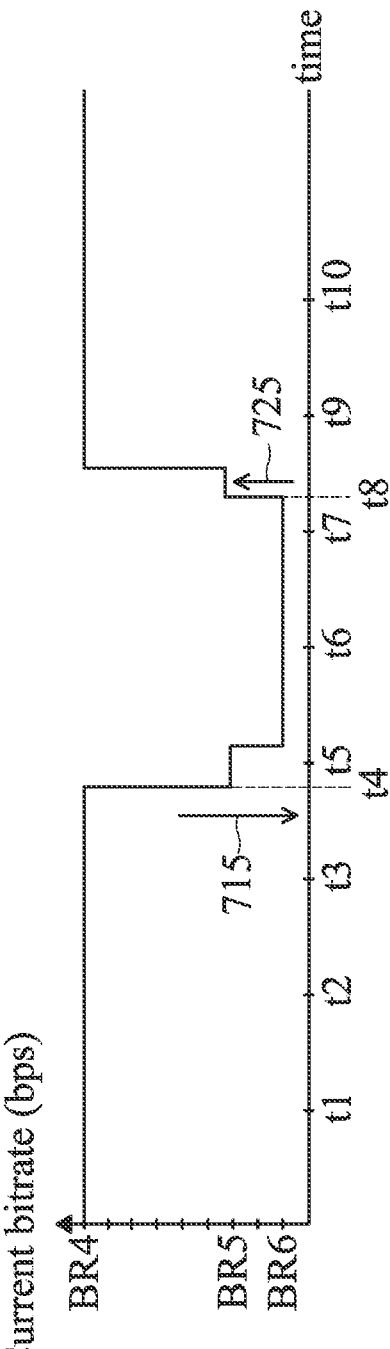
FIG. 7B shows a schematic illustrating the current bitrate BRc of the voice frames corresponding to the estimated TBS of FIG. 7A according to some embodiments of the invention.

FIG. 7A shows a schematic illustrating the estimated TBS according to some embodiments of the invention, and FIG. 7B shows a schematic illustrating the current bitrate BRc of the voice frames corresponding to the estimated TBS of FIG. 7A according to some embodiments of the invention.

Referring to FIGS. 7A and 7B together, assumed that the audio codec type Type_B in the rate mapping table 600 of FIG. 6 is used to provide the voice frames, the UE is configured to provide the voice frames with the current bitrate BRc of BR4 to the mobile communication network according to the corresponding estimated TBS before time t3.

Next, from time t3 to time t5, the estimated TBS is decreased (as shown in label 710), which means the TBS assigned by the mobile communication network is decreased. Since the estimated bitrate BRe corresponding to the decreased estimated TBS is less than the current bitrate BRc, the UE is configured to reset the high bitrate period counter C_HB to zero and incrementally increase the low bitrate period counter C_LB (step S350 in FIG. 3).

If the low bitrate period counter C_LB does not exceed the threshold value TH, the UE is configured to keep the current bitrate BRc at BR4 (step S340 in FIG. 3). Once the low bitrate period counter C_LB exceeds the threshold value TH at time t4, the UE is configured to decrease the current bitrate BRc from BR4 to BR5 (as shown in label 715) according to the estimated bitrate BRe and to reset the low bitrate period counter C_LB (step S370 in FIG. 3).

After time t5, since the estimated TBS keep decreasing, the UE is configured to decrease the current bitrate BRc from BR5 to BR6 according to the estimated bitrate BRe when the low bitrate period counter C_LB exceeds the threshold value TH.

Next, from time t6 to time t7, the estimated TBS increases (as shown in label 720), which means the TBS assigned by the mobile communication network increases. Since the estimated bitrate BRe corresponding to the increased estimated TBS is greater than the current bitrate BRc, the UE is configured to reset the low bitrate period counter C_LB to zero and incrementally increase the high bitrate period counter C_HB (step S350 in FIG. 3).

If the high bitrate period counter C_HB does not exceed the threshold value TH, the UE is configured to keep the current bitrate BRc at BR6 (step S340 in FIG. 3). Once the high bitrate period counter C_HB exceeds the threshold value TH at time t8, the UE is configured to increase the current bitrate BRc from BR6 to BR5 (as shown in label 725) according to the estimated bitrate BRe and to reset the high bitrate period counter C_HB (step S370 in FIG. 3).

Since the estimated TBS keep increasing, the UE is configured to increase the current bitrate BRc from BR5 to BR4 according to the estimated bitrate BRe when the high bitrate period counter C_HB exceeds the threshold value TH.

In response to various given Up Link (UL) grant, the UE is capable of dynamically selecting a proper bitrate for RTP packets, so as to transmit the RTP packets more quickly, thereby decreasing delay and improving UL Mean Opinion Score (MOS), i.e., quality of audio codec.

Figure 8:
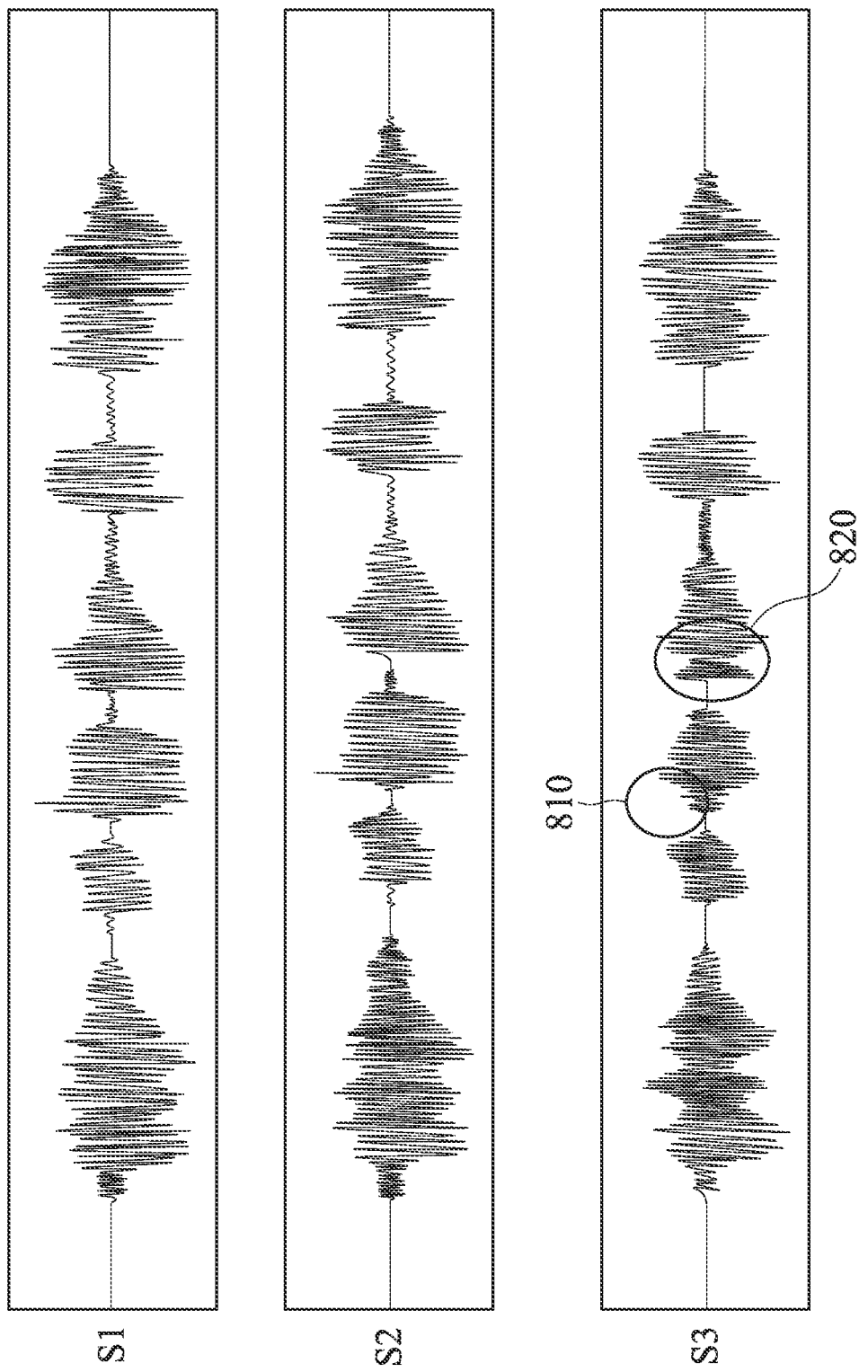
FIG. 8 shows a speech wave diagram illustrating the improvement in distortion and drag during a voice call according to some embodiment of the invention.

FIG. 8 shows a speech wave diagram illustrating the improvement in distortion and drag during a voice call according to some embodiment of the invention.

In FIG. 8, the signal S1 is an audio input signal obtained in a calling party. The signal S2 is an audio output signal obtained in a receiving party, and the UE of the calling party is configured to provide the voice frames of RTP packets corresponding to the signal S1 with adjustable bitrate according to the method 300 of FIG. 3 and the method 400 of FIG. 4. The signal S3 is an audio output signal obtained in the receiving party, and a traditional UE of the calling party is configured to provide the voice frames of RTP packets corresponding to the signal S1. In some embodiments, some voice optimization operations are performed on the signal S2 and signal S3 in the receiving party, e.g., echo suppression and cancellation. In FIG. 8, speech wave distortion and drag are significant between the signal S1 and signal S3, as shown in label 810 and label 820.

By adjusting the bitrate of voice frames in the UE of the calling party according to the method 300 of FIG. 3 and the method 400 of FIG. 4, speech wave distortion and drag are significantly alleviated under low UL grant, thereby achieving perceptible better speech quality from audio output in the receiving party and boosting MOS.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A User Equipment (UE), comprising:
    a wireless transceiver configured to perform wireless transmission and reception to and from a mobile communication network; and
    a controller configured to accumulate Transport Block Size (TBS) assigned by the mobile communication network during a first period and to perform an Exponential Moving Average (EMA) on the accumulated TBS, to obtain an estimated TBS during each first period, and obtain an estimated bitrate of a plurality of voice frames to be transmitted to the mobile communication network according to the estimated TBS,
    wherein when the estimated bitrate of voice frames is different from a current bitrate of the voice frames during a second period, the controller is configured to adjust the current bitrate according to the estimated bitrate; and
    wherein adjusting the current bitrate according to the estimated bitrate when the high bitrate period counter or the low bitrate period counter indicates that the estimated bitrate is different from the current bitrate during the second period further comprises:
        assigning the estimated bitrate as the current bitrate when the high bitrate period counter is greater than a threshold value.

2. The UE as claimed in claim 1, further comprising:
    a coder/decoder (codec) configured to provide the voice frames according to the current bitrate.

3. The UE as claimed in claim 1, wherein the first period is a Real-time Transport Protocol (RTP) sending period.

4. The UE as claimed in claim 1, wherein when the estimated bitrate is greater than the current bitrate, a high bitrate period counter is incremented by one and a low bitrate period counter is reset to zero.

5. The UE as claimed in claim 4, wherein when the high bitrate period counter is greater than a threshold value, the controller is configured to use the estimated bitrate as the current bitrate for the voice frames.

6. The UE as claimed in claim 4, wherein when the estimated bitrate is less than the current bitrate, the low bitrate period counter is incremented by one and the high bitrate period counter is reset to zero.

7. The UE as claimed in claim 6, wherein when the low bitrate period counter is greater than a threshold value, the controller is configured to use the estimated bitrate as the current bitrate for the voice frames.

8. The UE as claimed in claim 4, wherein when the estimated bitrate is equal to the current bitrate, the low bitrate period counter is decremented by one and the high bitrate period counter is decremented by one.

9. The UE as claimed in claim 4, wherein the low bitrate period counter is configured to count the number of the first periods having the estimated bitrate less than the current bitrate, and the high bitrate period counter is configured to count the number of the first periods having the estimated bitrate greater than the current bitrate.

10. A method, executed by User Equipment (UE), comprising:
    providing a plurality of voice frames with a current bitrate via a coder/decoder (codec), wherein the voice frames are to be transmitted to a mobile communication network;
    accumulating Transport Block Size (TBS) assigned by the mobile communication network during a first period and to perform an Exponential Moving Average (EMA) on the accumulated TBS, to obtain an estimated TBS during each first period;
    obtaining an estimated bitrate of the voice frames according to the estimated TBS; and
    adjusting the current bitrate according to the estimated bitrate when a high bitrate period counter or a low bitrate period counter indicates that the estimated bitrate is different from the current bitrate during a second period;
    wherein adjusting the current bitrate according to the estimated bitrate when the high bitrate period counter or the low bitrate period counter indicates that the estimated bitrate is different from the current bitrate during the second period further comprises:
        assigning the estimated bitrate as the current bitrate when the high bitrate period counter is greater than a threshold value.

11. The method as claimed in claim 10, wherein obtaining the estimated bitrate of the voice frames according to the estimated TBS further comprises:
    selecting a biggest allowable bitrate from a rate mapping table according to the estimated TBS.

12. The method as claimed in claim 10, wherein the first period is a Real-time Transport Protocol (RTP) sending period.

13. The method as claimed in claim 10, wherein adjusting the current bitrate according to the estimated bitrate when the high bitrate period counter or the low bitrate period counter indicates that the estimated bitrate is different from the current bitrate during the second period further comprises:
    incrementing the high bitrate period counter by one and resetting the low bitrate period counter to zero when the estimated bitrate is greater than the current bitrate.

14. The method as claimed in claim 10, wherein adjusting the current bitrate according to the estimated bitrate when the high bitrate period counter or the low bitrate period counter indicates that the estimated bitrate is different from the current bitrate during the second period further comprises:
    incrementing the low bitrate period counter by one and resetting the high bitrate period counter to zero when the estimated bitrate is less than the current bitrate.

15. The method as claimed in claim 10, further comprising:

incrementing the low bitrate period counter by one and incrementing the high bitrate period counter by one when the estimated bitrate is equal to the current bitrate.

16. The method as claimed in claim 10, wherein the low bitrate period counter is configured to count the number of the first periods having the estimated bitrate less than the current bitrate, and the high bitrate period counter is configured to count the number of the first periods having the estimated bitrate greater than the current bitrate.

* * * * *